(12) United States Patent
Rotello

(10) Patent No.: US 7,993,186 B1
(45) Date of Patent: Aug. 9, 2011

(54) SIMPLE, ULTRA-SAFE, LIGHTWEIGHT, HAND-HELD OYSTER-OPENING DEVICE

(76) Inventor: Gregory Adams Rotello, Ridgefield, CT (US)

( * ) Notice: Subject to any disclaimer, the term of this patent is extended or adjusted under 35 U.S.C. 154(b) by 0 days.

(21) Appl. No.: 13/021,696

(22) Filed: Feb. 4, 2011

Related U.S. Application Data

(60) Provisional application No. 61/282,415, filed on Feb. 4, 2010.

(51) Int. Cl.
*A22C 29/04* (2006.01)
(52) U.S. Cl. .......................................... 452/17
(58) Field of Classification Search .............. 452/1–13, 452/16, 17; 30/120.1–120.5
See application file for complete search history.

(56) References Cited

U.S. PATENT DOCUMENTS

| 2,133,529 | A | * | 10/1938 | Benson | 452/16 |
| 3,151,352 | A | * | 10/1964 | Hagen et al. | 452/16 |
| 5,669,275 | A | * | 9/1997 | Mills | 82/47 |
| 7,455,576 | B1 | * | 11/2008 | Flataker et al. | 452/16 |

* cited by examiner

*Primary Examiner* — Thomas Price
(74) *Attorney, Agent, or Firm* — Oakwood Law Group, LLP

(57) ABSTRACT

At present there's no universally adopted Handheld Portable Oyster Opener available to consumers. The Oyster Opener described herein is simple, quick and ultra-safe to operate. It's lightweight, robust, inexpensive, portable and handheld. It can be leveled in use to prevent unwanted loss of Oyster Liquor. This caulk gun style Oyster Opener can be easily carried and used by anyone regardless of their strength or dexterity. It can be used at home and passed around at outings for the safe, simple opening of oysters, large or small. Its intuitive ergonomic design and the synergistic integration of its lightweight functional elements allow a user to rapidly load, ideally position, firmly secure and effectively leverage an oyster open in a safe, regulated and controllably nuanced manner while keeping the oyster level. It allows the cutting of adductor muscles and removal of the top shell while an oyster is in the device.

20 Claims, 2 Drawing Sheets

SIMPLE, ULTRA-SAFE, LIGHTWEIGHT, HAND-HELD OYSTER-OPENING DEVICE

REFERENCE TO RELATED APPLICATIONS

This patent application claims the benefit of U.S. Provisional Application No. 61/282,415 filed on Feb. 4, 2010, the disclosure of which is incorporated herein by reference in its entirety.

BACKGROUND OF THE INVENTION

1. Field of the Invention

Unlike the basic designs of the instantly recognizable and nearly historically standard garlic press or potato peeler there is no small, lightweight, universally used and universally adopted equivalent in a portable oyster-opener that consumers purchase and use for passing around a table, to share together at dinner parties, to use in home kitchens or that they can easily carry with them for the quick and simple opening of oysters on beaches, on boats, while swimming and diving, while oyster harvesting and at outdoor picnics and tailgate parties. The present invention relates to using a lightweight, handheld, ratchet-driven caulk-gun style device that is substantially modified to create a novel device for the safe, simple and rapid opening of oysters by virtually anyone, anywhere they are. This device includes a hand-advanced and automatically-retractable push rod with a knife blade at one of its ends and a key for turning it in a 360 mode at it's other end, working in conjunction with an oyster supporting backstop, which itself is fixed or movable towards or away from the body of the device, and which allows a user of the device to quickly insert, lock firmly into place and then open an oyster, and then to quickly unlock and remove an opened oyster while the knife blade has been automatically returned, by the action of a re-setting spring, to its retracted and default starting position. This dynamic system allows the user to apply quick but carefully controlled, incremental and cumulatively added amounts of leveraging force to an oyster opening knife-blade in the graduated ways that the user decides is best suited to the task of forcing open the two opposing shell halves that are connected by cartilage at the point on an oyster, which is often referred to as the oysters beak. The term beak refers to the narrow, pointed end of an oyster where its two opposing half-shells are held together with a bonding cartilage. This devices push rod is coupled with a separate quick release mechanism and a has a spring-loaded and automatic blade-return function that rapidly retracts the knife-blade after an oyster has been opened. Those features work in conjunction with an oyster securing back-stop which can be moved towards or away from the body of the device and which can be locked quickly along any portion of a bar, a bed or a set of rails that are connected to the body of the device, which is designed to aid the user in rapidly inserting, rapidly positioning and rapidly securing an oyster within the device, and that helps hold the oyster firmly in place as it is being opened, that helps hold the oyster firmly in place as it's two adductor muscles are cut, that helps hold the oyster firmly in place as its top-shell is removed and that can be rapidly disengaged from its bar, bed or rails which allows an opened oyster to be quickly removed from the device for serving. This system allows almost any user to open oysters in a speedy and controlled manner that is extremely safe, simple to perform and very efficient. A person who has never before opened an oyster will find using this device both easy to learn to operate, and easy to actually operate. Even a person of moderate strength will be able, in most cases, to quickly and very easily insert, secure, open and remove an oyster in an extremely fast and safe mode. Users will also find they can open an oyster while easily tilting this lightweight device to keep the oyster being opened at a perfect mode of levelness which prevents the messy spillage and inadvertent loss of precious oyster liquor that is common with nearly every oyster opening device. While an opened oyster is still held firmly within this device users can additionally cut the oysters adductor muscle with a secondary handheld knife and then remove the oysters upper shell-half while the bottom half of the oyster shell and the oyster within it remains level and secure within the device which allows the user to cut the oysters bottom adductor muscle without spillage and loss of oyster liquor while the oyster is held level and still secured within the device. Users may use this device without the common oyster-opening concerns of nerve wracking knife moves, hand and wrist strains and accidental self inflicted hand stabbings. This inexpensive oyster opening device is small, robust and very light in weight and can be easily lifted, continuously held without strain, portably carried to any venue, passed from person to person and easily employed for the quick, simple and ultra-safe opening of oysters with minimal physical effort.

2. Description of Related Art

Devices for opening oyster and clam shells is known in the prior art. More specifically, by way of example U.S. Pat. No. 7,393,270 to Cross discloses a base and a reconfigurable handle pivotably connected to the base.

U.S. Pat. No. 6,244,948 to LiRosi discloses a punch, such as a wedge-shaped blade, fixedly attached to a rack and pinion geared shaft for aligning and axially translating the punch along a second axis for opening a shellfish.

U.S. Pat. No. 6,190,248 to Holley discloses a heavy base portion having a vertical column with a spreader operated by hand having jaws which, upon depressing a handle are spread apart. A movable anvil is provided with a pivotal lever arm for positioning an oyster relative to the jaws of the spreader.

U.S. Pat. No. 5,482,500 to Boettner, et al. discloses a base plate having a support channel for receiving and supporting an oyster. A lever arm is pivotally mounted to the base plate and includes an engaging tip secured to the lever arm and positioned for engagement with the oyster in the support channel to crack and open the oyster.

U.S. Pat. No. 5,334,080 to Webb discloses coupling bars that are attached to a lever and a blade that is attached and driven into a clam or oyster trapped between the lower plate and the blade.

U.S. Pat. No. 5,288,263 to Ayala discloses a base having a knife pivotably mounted about a first axis and a hammer pivotably mounted about a second axis on the base. The knife is lifted by extended upward movement of the hammer but the hammer is free to move relative of the knife during downward movement.

For many people the process of opening an oyster is a physically taxing, dexterously difficult, potentially-dangerous and time consuming task.

It is an object of this invention to provide a 'caulk gun' style oyster-opener that uses a static or movable oyster holding member connected to a bar, a bed or set of rails and a leveraged and advancable and quickly retractable knife blade to pry open an oyster, and which is not a table vice style or a wood-clamp style oyster opener.

It is an object of this invention to provide a contoured steel oyster holding member with an embossed-surface or semi-flexible surface that aids in the holding and the secured positioning of the oysters shell before during and after it has been opened.

It is an object of this invention to provide both an advancable and retractable and 360 degree rotatable shaft and knife-blade that is advanced forward by a hand squeezed leveraging element and that can be rotated 360 degrees by the users twisting of a T shaped or other conveniently shaped handle at its end.

It is an object of this invention to provide a rotatable shaft that on one end is a fashioned knife-blade with a tapered and curved blade-point that follows the natural opening-path at an oysters beak and which allows the knife blades tip to be turned rotated and variably positioned by the user in an infinite number of angles entry into the oyster that's being opened.

It is an object of this invention to provide an oyster opener with an expandable double 'scissors-style' conveyance for advancing and retracting the oyster holding back-stop towards or away from the body of the device and that can fold and unfold and which on one end
is affixed an oyster holding back-stop while the other end is affixed to the main body of the device, which can be expanded or contracted to bring the oyster holding back-stop closer to or further from the main body of the device.

It is an object of this invention to provide a portable, hand held oyster opening device that can be easily carried to picnics, conveniently used at a dining-table and easily passed from person to person.

It is an object of this invention to provide an ultra-safe Oyster Opening Device that is safe and which does not require the use of protective gloves.

It is an object of this invention to provide a viable alternative to the standard styles of oyster opening knives.

It is an object of this invention to provide a simple to operate oyster opening device that almost anyone can operate easily.

It is an object of this invention to provide an Inexpensive oyster opening device.

It is an object of this invention to provide an oyster opening device that utilizes some basic functional leveraging and handling elements which are in common with a standard ratcheted hand-held caulking gun.

It is an object of this invention to provide an oyster opening device that includes a forward-driven, quick-retracting spring-operated oyster opening knife-blade that retracts through the press of a button to reset the Oyster Opening Blade back to its standard starting-position after each oyster has been opened.

It is an object of this invention to provide an entirely hand-held oyster opening device that can be self leveled by the user to prevent the spillage of oyster liquor during the process of opening an oyster.

It is an object of this invention to provide an Oyster Opening device that employs a Turnable and Twistable Knife Blade which can be manipulated to facilitate the blades entrance into the beak portion of the oyster and which facilitates the blades removal after the oyster has been opened.

It is an object of this invention to provide an oyster opening device that utilizes a thin-tipped, slightly up-curved blade that can be rotated and flipped by the user, prior to opening an oyster, that allows the user to orient the tip of the knife blade into either one of two distinct blade-positions and an unlimited number of positions in between and that allows the user to adjust the position of the blades-tip in a 360 degree manner to the position the user determines is best suited for gaining entrance and opening a specifically shaped oyster depending on the physical configuration of that particular oyster.

It is an object of this invention to provide an oyster opening device that utilizes a specifically contoured and slightly upwardly curved blade-tip that's designed to facilitate the opening of oysters which have curved beaks or tight and narrow beaks which are normally difficult to open with a straight forward blade that's employed in many mechanical oyster opening devices.

It is an object of this invention to provide an Oyster Opening device that produces few or no chips or bits of fractured oyster shell during the process of opening an oyster.

It is an object of this invention to provide an Oyster Opening device that operates efficiently and with stability without the addition of a heavy cumbersome base.

It is an object of this invention to provide an Oyster Opening Device that is extremely durable and lightweight.

It is an object of this invention to provide an Oyster Opening device that is compact and light enough to be passed from person to person at a table and that can be stored in a ordinary, medium sized kitchen drawer.

It is an object of this invention to provide an Oyster Opening device that can be operated by hand/eye manipulation which allows a flexible method of oyster opening.

It is an object of this invention to provide an Oyster Opening device that includes a novel Oyster Opening Blade-Tip that is specifically ground, curved and contoured for opening the maximum number of physical forms, physical types, physical sizes, physical lengths and physical shapes of various types of oysters.

It is an object of this invention to provide an Oyster Opening device that includes a novel back-stop that is specifically curved and contoured for the most efficient cushioning and holding of the maximum number of physical forms, physical types, physical sizes, physical lengths and physical shapes of various types of oysters that are placed against it.

It is an object of this invention to provide an Oyster Opening device that employs a simple and quick Oyster Lock-Down System which allows a user to insert and lock an oyster rigidly into place, before, during and after the oyster is opened.

It is an object of this invention to provide an Oyster Opening device that allows the user to cut the adductor muscle of the oyster after the device has opened the oysters shell, and allows the removal of the oysters top shell while the oysters bottom shell and the oyster within it is still being securely held within the device.

It is an object of this invention to provide an Oyster Opening device that opens oysters with a force-leveraging blade that's driven forward by a simple, one handed squeezing of a leveraging handle affixed to a caulk-gun like device.

It is an object of this invention to provide an Oyster Opening device predicated on a caulk-gun style design that utilizes a Soft Sling affixed to the frontal body of the handheld caulk-gun like leveraging-device device and composed of a durable flexible material such as woven-kevlar or chain-mail which acts to hold an oyster in place as the force leveraged blade is inserted then driven into the oyster and which allows the user to twist the main body of the oyster once its beak has been penetrated by the oyster opening knife-blade, hence fully leveraging the oyster open.

It is an object of this invention to provide an Oyster Opening device predicated on a caulk-gun style design that utilizes a bar, a bed or a set of twin rails which are affixed to the body of the gun and which allow a rapid forward or backward movement of a back-stop which rides upon those rails or the bar.

It is an object of this invention to provide an Oyster Opening device that utilizes two side by side rails, a bed or a single bar that provides secure contact-support for an oysters Bottom-Shell as it's positioned and held within the device and then leveraged-open within the device.

It is an object of this invention to provide an Oyster Opening device predicated on a caulk-gun style design that utilizes a ratchet-driven oyster opening knife-blade in conjunction with a back-stop that is permanently-affixed to one end of a bar, a bed or set of rails.

It is an object of this invention to provide an Oyster Opening device predicated on a caulk-gun style design that utilizes a fixed ratchet-driven oyster opening knife-blade in conjunction with a back-stop that is permanently-affixed to one end of a set of rails or to a bar which themselves can be mechanically attached to the main body of the device in such a manner that they can be slid and moved either forwards or backwards, hence allowing the user to reposition the back-stop at various distances from the main body of the device.

It is an object of this invention to provide an Oyster Opening device predicated on a caulk-gun style design that utilizes a fixed ratchet-driven oyster opening knife-blade in conjunction with a back-stop that can be moved and re-positioned as it travels over a set of guide rails or along the length of a guide bar.

It is an object of this invention to provide an Oyster Opening device predicated on a caulk-gun style design that utilizes a fixed ratchet-driven oyster opening knife-blade in conjunction with a back-stop that is spring-loaded which allows a user to very quickly re-position it as it travels over a bar, a bed or set of rails which are affixed to the body of the device.

It is an object of this invention to provide an Oyster Opening Device that makes use of the human hands unique ability to squeeze together two opposing grips.

It is an object of this invention to provide an Oyster Opening device that operates quickly, simply and easily allowing its user to open many oysters a minute over a continuous period of time.

It is an object of this invention to provide a New Type of Oyster Opening Device that can be produced as a viable working unit that is very compact and that can weigh as little as fifteen ounces or less, depending upon the materials from which it is fashioned.

It is an object of this invention to provide an Oyster Opening Device that features a fast lockdown and release function that quickly locks and unlocks the back-stop to or from a guide bar or to or from a set of twin guide rails and that takes place in under a second and that's facilitated by the light pressing of a button on or near the back-stop by the user It is an object of this invention to provide an Oyster Opening Device that features a quickly retractable spring-loaded knife-blade that can automatically reverse it's direction and retract to reset itself to its default opening-position in under a second that rapid retraction facilitated by the light pressing of a button by the user.

It is an object of this invention to provide an Oyster Opening Device that features the rapid releasing of an oyster in under a second, that was previously locked solidly in place within the device, with that rapid releasing of the oyster facilitated via the light pressing by a user of a quick-release release-mechanism that is conveniently situated on the device.

It is an object of the invention to provide an oyster opening device that is very safe to use and which does not require the use of protective gloves.

It is an object of the invention to provide an oyster opening device that is entirely and easily portable.

It is an object of the invention to provide an oyster opening device that allows for a rapid insertion and a quick stable locking in place of an oyster prior to it's actual opening by the devices leveraged knife-blade.

It is an object of the invention to provide an oyster opening device that is light enough and compact enough to be entirely hand-held and further that this oyster opening device is light enough and compact enough to be easily and continuously supported by the user for extended periods of time.

It is an object of this invention to provide an oyster opening device that allows the user to safely adjust the positioning of the oyster while it is in the process of being leveraged open by the device to facilitate the most efficient opening of that oyster.

It is an object of this invention to provide a simple to operate oyster opening device that almost anyone can operate easily regardless of strength or dexterity.

It is an object of this invention to provide an oyster opening device that employs a turnable and twistable knife blade which can be manipulated and turned 360 degrees to facilitate the blades entrance into the beak portion of the oyster, and which can also be manipulated and turned to leverage an oyster open even further once it's been penetrated by the oyster opening knife blade and which also facilitates the knife-blades quick and easy removal after the oyster has been opened.

it is an object of this invention to provide an oyster opening device that allows a user to quickly insert an oyster, quickly lock it in place within the device, quickly open the oyster and quickly remove the oyster from the device and to continue that sequence in a rapid and repetitive manner.

It is an object of this invention to provide an oyster opening device that operates efficiently without a cumbersome base, that is compact, entirely handheld, lightweight and that can be passed from person to person or easily carried to a picnic and that can be stored in a ordinary, medium sized kitchen drawer.

It is an object of this invention to provide an oyster opening device that allows the user to cut the adductor muscle of the oyster and easily free and remove the oysters upper shell after the device has opened the oysters shell and while the oysters bottom half-shell is still being held firmly in place by the oyster opening device.

There are numerous approaches that various people employ to facilitate the opening of oysters. Most involve the use of an oyster knife of which there are numerous traditional and contemporary variants. In actual use oyster opening knives are often inserted into the channel opening at the 'beak' of an oyster and then directionally manipulated into the cartilage filled gap between the oysters two opposing half-shells by the user. As the forced knife gains entrance through the cartilage filled channel that links the oyster's shell halves at some critical point, the oyster's two half-shells become partially opened and partially separated at which point the oysters two adductor muscles are cut with the oysters top shell removed then discarded. The complex movements that the user performs with the oyster opening knife include the use of the users eyes, wrists, hands, fingers and arms, all of which allow the user of the oyster knife a modicum of directional control, of applied force control and of general and specific motion control.

The opening of an oyster by an experienced oyster shucker who deftly wields an oyster shucking knife may appear to be a simple act, but shucking an oyster is actually a sophisticatedly progressive, physically-demanding and considerably nuanced process, and it is both perceived as and in practice actually is a 'potentially dangerous' process. For those and other reasons inexperienced individuals often find the process of opening an oyster to be difficult, unnerving or even impossible to perform. A result for many people is that the opening of oysters, as a food preparation routine, becomes one that they approach with trepidation, or one that they avoid entirely, or one that they leave to others more skilled to perform for them, and usually at some cost.

Many consumers and lovers of oysters forego their desired 'at-home' or 'at picnics' oyster consumption experiences because of the various difficulties involved with the opening of them and as a consequence, many fewer oysters are sold by shell fish growers and by the retailing industries than would otherwise be vended if those negative issues associated with the opening of oysters were somehow negated and alleviated. This new oyster opening device fully negates virtually all of the negative oyster opening Issues and can do so at an affordable retail price.

Many mechanical devices could be fashioned that would open an oyster, but few of them are lightweight, very easy to use, speedy in their operation and ultra-safe. Fewer of them allow an oyster to be kept level during it's opening so as not to spill its liquor nor do they incorporate a mechanical system that, like the operation of a simple oyster knife, takes advantage of the sensory hand-eye feedback that a user experiences during the actual process of opening an oyster, in order to carefully modulate and directly control the mechanical process of opening an oyster with such a mechanical system.

A new handheld and very useful oyster opening device that includes a hand-squeezable caulk-gun style force-leveraging drive coupled to a specifically shaped oyster-opening knife-blade that is connected to a quick-release function which allows to automatically retract after an oyster has been opened and that works in an integrated mode with an oyster supporting back-stop which securely locks-down and that holds an oyster in position as it is being leveraged open, to accomplish the goal of creating a new oyster-opening device which will be entirely capable of opening an oyster in a new and improved way.

The advantage of using extant quick-release caulk-gun style-devices as a starting point for creating a new type of oyster opener is that these devices, once sufficiently and non-obviously modified, will allow a user of such modified devices to apply intelligently-controlled, incremental, discreet and cumulatively-added amounts of force to an oyster-opening knife-blade in the ways that are best suited to the knifes intended task of forcing-open the two opposing shell-halves that are connected by cartilage at the point on an oyster which is often referred to as its 'beak'.

Another advantage in using these modified caulk-gun style-devices is that once they have been sufficiently-modified they will allow almost any user to open oysters in a speedy, well-controlled manner that is extremely safe, simple to perform and very-efficient. A person who has never before opened an oyster will find using this device or its variants, which are described below, simple to learn to operate and simple, in-practice, to actually operate. Even a person of moderate strength will be able, in most cases, to easily open an oyster. Users of the devise will also find they can open oysters without the common oyster-opening concerns of nerve-wracking knife-moves, hand and wrist strains and accidental self-inflicted hand-stabbings.

The oyster opening device and its variants below are small, robust and very light in weight. They can be easily lifted, easily held aloft during their usage for long periods of time without tiring their operators, they can portably carried and easily-employed for quick, safe opening of oysters, all with minimal effort.

Another advantage of using such extant caulk-gun style-devices is that they serve as examples for the relatively quick fashioning and construction of this new type of oyster-opener for someone skilled in the arts, in order that they may gain a better understanding of the basic design principals involved in this new oyster-opening device.

The modified caulk-gun style devices that are described below will serve here mainly as useful illustrations and as illustrative examples of the basic mechanical principals involved in creating the new type of oyster opening device here disclosed. The oyster opening device here disclosed is based on those modified devices abilities to provide their users with a convenient and continuous capability for inserting and securing an oyster to be opened, for hand re-positioning of the oyster to be opened while it is secured within the device and for the careful application of manually controlled, incrementally driven knife-blade leveraging, along with controlled-applications of additive-force and controlled rates of applied forces to the knife blade as well as a fast and automatic resetting of the knife-knife blade after an oyster has been opened and the quick physical releasing from the device of a previously secured oyster once that oyster has been opened by the device, which are all provided by the general configuration and the working-dynamics of this new oyster opening device.

SUMMARY OF THE INVENTION

In an exemplary embodiment of the present invention, there is disclosed apparatus for opening an oyster shell comprising:

a body having a push rod with a turning-key at one end and a blade for opening an oyster shell at its other end;

a drive coupled to a movable handle to incrementally advance the push rod from a retracted position to an extended position each time the handle is squeezed;

a manually operable quick release brake coupled to frictionally engage the push rod wherein the brake allows the push rod to incrementally advance to extended positions and holds the push rod in the extended positions and, when operated allows the push rod to return to its fully retracted position;

a spring coupled to the push rod to automatically urge the push rod to return to its fully retracted position when the manually operable quick release brake is operated; and a static oyster holding back-stop coupled to the body via a bar, bed or rails for holding an oyster shell as the blade of the push rod is advanced between the oyster shell halves.

a movable oyster holding back-stop coupled to the body via a bar, bed or rails for holding an oyster shell as the blade of the push rod is advanced between the oyster shell halves.

In another exemplary embodiment of the present invention, there is disclose a method for opening an oyster shell comprises:

providing a body having a push rod with a key at one end and a blade with a contoured tip for opening an oyster shell at its other end;

providing a drive coupled to a movable handle to incrementally advance the push rod from a retracted position to an extended position each time the handle is squeezed;

frictionally engaging a manually operable quick release brake to the push rod to allow the push rod to incrementally advance to extended positions and hold the push rod in the extended positions and, when operated allows the push rod to return to its fully retracted position;

coupling a spring to the push rod to automatically urge the push rod to return to its fully retracted position when the manually operable quick release brake is operated; and coupling an oyster holding member to the body for holding an oyster shell as the blade of the push rod is advanced between the oyster shell halves.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Figure 1:
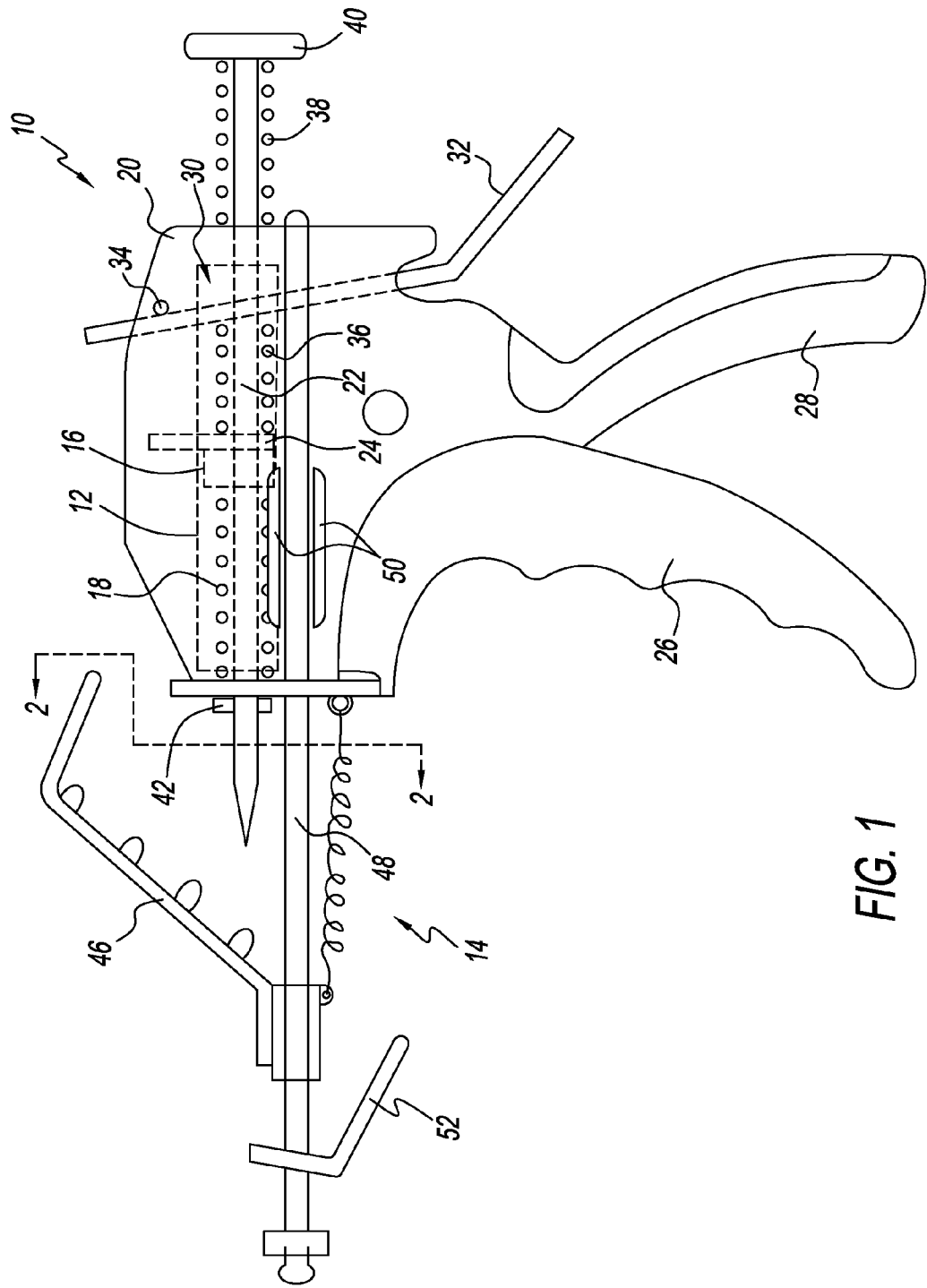
FIG. 1 is a partial cut away side view of a hand held apparatus having a push rod drive and breaking assembly, and an oyster opening device for opening oysters in accordance with the principles of the invention.

Many mechanical devices can be fashioned that would open an oyster, but few of them are lightweight, very easy to use, capable of keeping an oyster level as it is forced opened so as not to spill its liquor, or speedy in their continuous operation, physically gentle to the oysters outer shells and ultra-safe. Fewer of them incorporate a mechanical system that, like the operation of a simple oyster knife, takes advantage of the sensory feedback that a user experiences during the actual-process of opening an oyster, which allows the user to carefully modulate the force and speed of the process, to adjust the position of the oyster as it is being opened, to directly control the unified mechanical elements of opening an oyster with such a mechanical system or to easily insert, force open and then quickly remove an oyster in an extended continuing process.

The new oyster opening device here disclosed incorporates the users own tactile, muscular and visual feedback, and allows the user to substantially orchestrate, during the actual oyster opening procedure, the most efficiently coordinated finger, hand and arm movements to moderate, control and to operate the mechanical elements of this device as it is being used to open an oyster while keeping that oyster level.

Much like an oyster knife, this new oyster opening device actively employs the users own sensory feedback and the users fingers, hands and arms that, in effect, become an integral and intelligent part and essential element of this oyster opening device as it is being used to open an oyster.

This new oyster opening device allows almost anyone to open an oyster with relative physical ease, with a very high degree of personal safety and with considerable speed when compared with using an oyster opening knife or when using other common mechanical oyster opening systems and other various oyster opening aids.

This new oyster opening device is 'extremely effective' because its functioning not only employs a incrementally controllable, efficient, lightweight mechanical force leveraging component and a very quick oyster positioning and cushioning system, but also includes the users own visual and sensory feedback to actively guide and manipulate with nuance the mechanical processes that takes place as the device performs the operation of opening the oyster.

In many salient ways this new oyster opening device mimics the physically dynamic mechanical process involved in opening an oyster with a traditional oyster opening knife, but unlike an oyster knife it accomplishes that task with extreme personal safety, nuanced control and leveraging advantages which do not exist when a user employs an oyster knife to open an oyster.

Terms Used and Defined Herein

'Handle': The term handle refers to any squeezable handle set that a user operates with one hand wrapped around a mechanical configuration that allows an application of user applied pressure to be generated when the users hand squeezes together both portions of the squeezable handle set.

'Push Rod': The term push rod is used to refer to a push rod that exerts and applies working pressure created by the user. Push rods can be of cross sections that are oval, circular, rectangular, square, hexagonal or other shapes. The push rod applies a force in a direction that is toward an oyster that is being opened and conveys a working force that is generated by a user. For purposes of simplicity, the term 'push rod' will be used to describe all of the particular main work force applying rod elements, regardless of their specific physical characteristics like lengths and gauges and regardless of whether their cross-sections are oval, circular, rectangular, square, hexagonal or otherwise shaped.

'Backstop': The term back-stop applies to any specific part, elemental, structure or contrivance that serves to hold, to position, to secure an oyster's shell in a general and well placed position for its easiest opening by the oyster opening device described herein. The oyster beak is the pointed part of any oyster. The 'oyster bill' is a common term for the broadest and thinnest fan like frontal-portion of an oyster. A 'backstop' is a part of the new oyster opening device described that holds, secures, positions the oyster bill and that helps keep the oyster securely positioned as it is opened by applied pressure of the push rods knife-blade during its process of being opened.

Oyster Popping 'Key': The term key is used to refer to an element or part or subassembly that allows a user who has partially opened an oyster with an oyster opening knife blade to complete that process by exerting an additional amount of opening leverage that rapidly forces open, (pops and breaks), and physically separates the cartilage connection that holds together the oysters two opposing shell-halves.

'Quick Release': The term quick release describes any subsystem of the oyster opening devices described herein that allows a user to quickly release all accumulated force that exists within the pushing rod and further allows fast and easy automatic retraction of the pushing rod and or the back-stop by a spring in compression once the quick release has been activated by the user. The term 'Quick Release' also refers to the mechanism that releases the lockdown-feature that binds the back-stop to the bar, bed or twin set of rails that it travels upon.

'Body' The term body refers to the structural element that supports the push rod, the push rod drive and the push rods brake and release assembly and the caulk-gun style body of this oyster opening device.

'User' The term user refers to persons, operators and consumers of this new oyster opening device.

'Bill Breaker', The term bill Breaker refers to any subassembly or sub-device affixed or in any way is attached to this new oyster opener that allow a user to break off and to remove from an oyster's beak any protuberance or overhang of the shell that would obstruct the device's oyster opening knife blade tip from gaining direct and easy access to the narrow, slightly open and cartilage filled channel between the oysters two opposing shell halves at that area of the oyster commonly referred to as its 'bill'. In use the overhanging portion of the oyster's beak is inserted between two small, case hardened opposing metal bars and then the oyster is moved directionally until the offending obstruction portion of it's overhanging bill has been chipped clear, snapped free and broken off.

Referring to FIG. 1, there is shown a partial cut away side view of a hand-held apparatus 10 having a push rod drive and breaking assembly 11 located within the dashed rectangular box 12, and an oyster holding and opening device 14 for opening oysters in accordance with the principles of the invention. The push rod drive and breaking assembly in box 12 includes a driving element 16 and a driving spring 18 located within the body 20 and surrounds a push rod 22. The driving element 16 is urged to move incrementally toward the left each time the user squeezes the movable handle 26 toward the right to the stationary handle 28 by a driving shaft 24 which is attached to the movable handle 26. As the driving element 16 moves toward the left it frictionally engages the push rod and moves the push rod to the left. A breaking assembly 30 includes a breaking lever 32 that pivots about a shaft 34 and a breaking spring 36 that surrounds the push rod 22. The breaking assembly 30, allows the push rod to move toward the left prevents the pushrod from moving back toward the right as the driving element 16 returns to the right.

As the push rod is moved toward the left, push rod return spring 38 is compressed between the body 20 and the end or key 40 of the push rod which can be a cross member that forms a "T" shaped handle.

The left end of the push rod can advance from its fully retracted position toward the right to it fully extended position toward the left, a distance of between one-quarter of an inch and one inch where one-half of an inch is preferable.

When the push rod is in an extended position, it can be automatically released to it fully retracted position by pressing on the breaking lever 32 which allows the return spring 38, which is in compression, to urge the push rod to its fully retracted position. A positive stop, such as a pin 42 located in the push rod limits the distance that the push rod can move to the right. The quick-release feature automatically releases all the force on the oyster opening knife, automatically frees the knife from the oyster and retracts the knife that opened the oyster which in turn sets the knife for opening.

The operation of the push rod drive and breaking assembly located within the dashed rectangular box 12 is similar to the operation of quick release push rod drives on conventional caulking guns and, therefore, a detailed description of the method of operation is not here presented.

The advantage of using a quick-release push rod drive and breaking assembly as disclosed for opening an oyster shell is that a user can apply controlled, incremental, discreet and cumulatively added amounts of force to an oyster opening knife blade in the ways that are best suited to the knifes intended task of forcing open the two opposing shell halves that are connected by cartilage at the point on an oyster which is often referred to as its 'bill'.

Another advantage in using the quick-release push rod drive and breaking assembly is that it will allow almost any user to open oysters in a speedy, well controlled manner that is extremely safe, simple to perform and very-efficient. A person who has never before opened an oyster will find using this device simple to learn to operate and simple in practice to actually operate. Even a person of moderate strength will be able, in most cases, to easily open an oyster. Users of the devise will also find they can open oysters without the common oyster opening concerns of nerve wracking knife moves, hand and wrist strains and accidental self inflicted hand stabbings.

The oyster opening device disclosed is small, robust and very light in weight. It can be easily lifted, portably carried and easily employed for quick, safe opening of oysters with minimal effort. It's light weight and relatively small size allows the user to level the entire oyster opening device while an oyster is locked within it, thereby minimizing the spilling of the oysters liquor as the device is opening it.

In an embodiment the push rod may be notched along its length rather than being smooth. In this embodiment a simple forwarding mechanism located within the main body 20 is employed that physically seats into the notches and acts to transfer forces generated by the user squeezing of the movable handle directly to those notched by virtue of the close fit between the notches and the force transferring mechanisms driven by the squeezing of the movable handle they are in contact with.

Regardless of which type of push rod drive and breaking assembly is used, the net work performing effect is roughly the same. Force generated by a user squeezing the movable handle is transferred by a smooth or notched ratcheting mechanism and is directed to the smooth or notched push rod.

The configuration, shape and the hardness or temper of the oyster opening knife blade is an additionally element in the construction of this new oyster opening device. It is advantageous that the oyster opening knife blade, that is either a part of or is affixed to the push rod is durable and its strength is sufficient to accomplish the task of repeated openings of oyster-shells. So it is advantageous that the oyster opening knife blade is made of a material that can be sufficiently tempered and properly shaped. It is also important that the knife blade be fashioned in shape, tempering, durability, and quality of its component materials, including sufficient surface finish and blade edge grinding.

The knife blade at the end of the push rod can also be configured in such a way that it is 'twisted' in a more than or less than 90 degree configuration similar to the angular surface contour change, from tip to yoke, of an airplane propeller blade. The twist or bend may occur a short way up the blades actual length in such a way that the tip of the blade enters the oyster's bill channel in a horizontal plane, but upon further progress of entrance its twist will come into play and, in effect, convert the blades attacking axis to one of a vertical width plane (instead of the original horizontal width plane) that would additionally force open the oyster's two opposing shell halves as a result of the twisting alteration of the blades angle of forward-attack.

The knife blade tip at the end of the push rod can also be configured in such a way that it is curved slightly upwards at its tip to facilitate it's entry into the oysters beak point. Further the entire knife blade can be turned in orientation by twisting its KEY so that the knife blades curved-tip can be adjusted to point in either an up or down position or anywhere in between, depending on the users visual assessment of which of those orientations is best suited to opening a particular oyster It is noted that with the push rod drive used to advance the push rod there is an important additional effect that utilizes the effect of cumulative, additive force coupled with a lightweight overall design coupled with a one handed leveraging operation, coupled with the option of allowing the user to regulate the rate of the device work progress coupled with the ability to offer the user the option of pausing in his or her application of force to make adjustments while the device retains and stores the cumulative forces that were previously applied by the user.

In time and after additional squeezing of the handle by the user a considerable amount of force is applied by the push rod and to the knife blades tip, enough force, at some critical threshold, to force partially apart or fully apart the two opposing halves of an oyster's shell.

This cumulative and additive force allows most persons and even persons of very moderate hand strength to eventually apply whatever amount of force that is needed to drive the oyster opening knife blade into the oyster, and hence, to complete the process of opening an oyster that is situated within the new device.

This additive force effect allows graduated, additive and cumulative amounts of controlled force to be applied during the oyster opening process, and it allows the user the benefit of assessing the progress of the oyster opening process, as it is taking place. It also allows the user to adjust and re-adjust the position of the oyster itself as and while uninterrupted force is being hand applied to the handle 26, and it allows the user to slow down or even stop the oyster opening process entirely without losing the force he or she has already applied to the knife that is opening the oyster. It also allows the user newer applications of additional incremental force if the user concludes that additional amounts of force are what is needed to complete the opening of the oyster.

Figure 2:
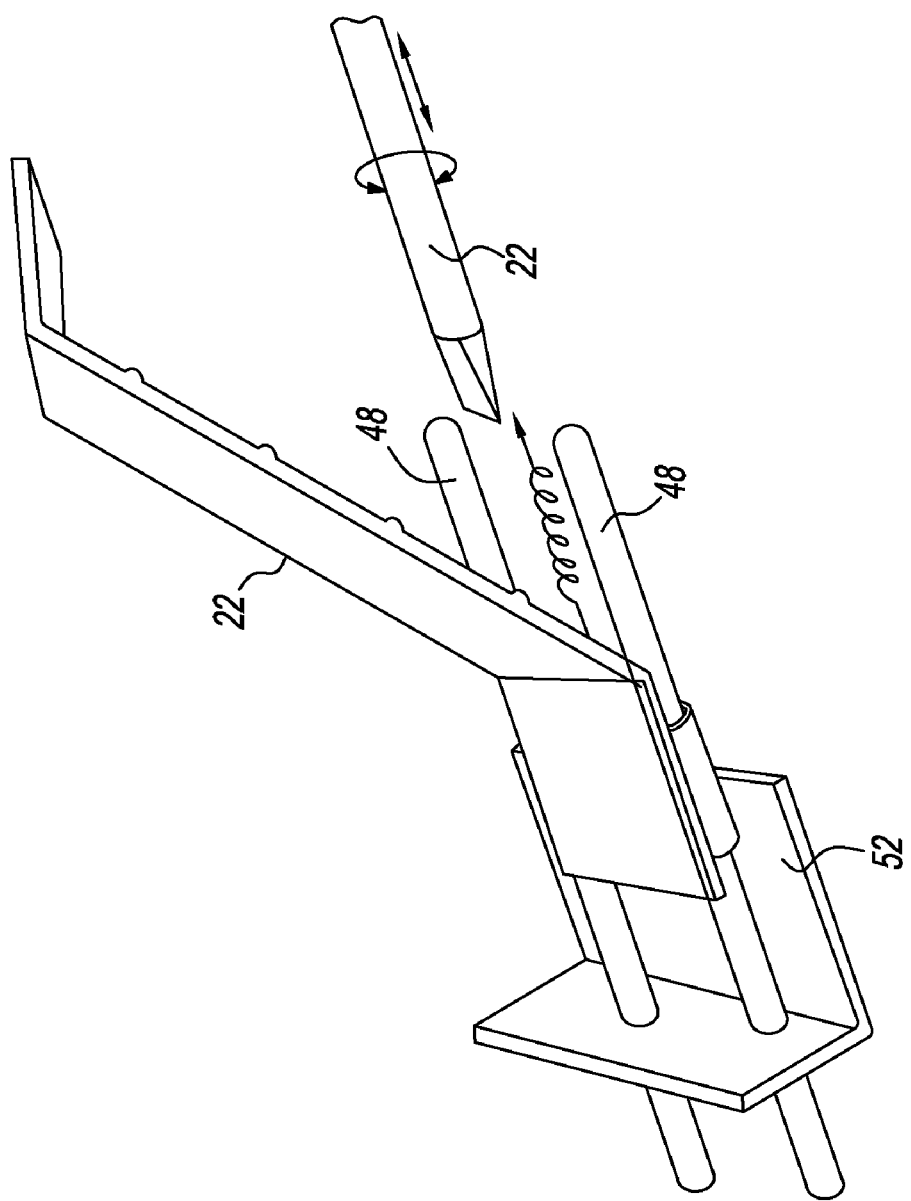
FIG. 2 is a perspective side view of the hand held oyster opening device looking along the line 2-2 of FIG. 1 showing the oyster opening device in accordance with the principles of the invention.

FIG. 2 shows a perspective side view of the hand held oyster opening device looking along the line 2-2 of FIG. 1. Referring to FIGS. 1 and 2, the oyster holding and opening device 14 has a dedicated and somewhat pliable back-stop 46 at its far-end. The oyster back-stop provides a stop that the oyster's beak rests against, is cushioned by and is pushed against while pressure delivered by the knife blade pushes against the oyster's bill as it is also in the process of prying open the oyster's bill, its somewhat-rounded front section.

The oyster back-stop allows the oyster to initially be positioned by the user in any particular way that the user finds most dynamically appropriate, in terms of situating the oyster nearest to the most efficient angle required to allow the oyster opening knife blade, that is situated at the front end of the push bar, its best vector or its best angle of access to the narrow, downwards angled joint between the oyster's two opposing half shells, at the partially vented point located at the end point of the oysters beak.

Workable oyster back-stops 46 can be made from plastic, metal, neoprene, rubber, sponge or any material or combinations of any materials appropriate for holding and cushioning an oyster securely in place while pressure from the oyster opening knife blade applies pressure to the overall oyster shell as it pushes against the narrow opening at the oysters beak. The back-stop can be fashioned as a cup, oval or circular ring, block of inverted steps, curved-plane, cone, open pyramid or other geometric or irregular shape. Appropriately shaped back-stops can made from fabrics or in the form of notched planes, frontally ribbed surfaces or other configurations of appropriate materials and shapes. Because an oysters bill, which itself is somewhat thin, will be subjected to pressurized contact with the back-stop. The back-stop working and supporting surface can be fashioned from materials that have some degree of 'give', mechanical grip, plasticity or flexibility in order to prevent the oyster's thin outer bill-shell from chipping, sprawling, breaking or cracking as pressure is applied to the overall shell during the oyster opening process.

The back-stop can be fashioned in a way that it does not clamp, crimp, lock shut or in any substantial way impinge on the oyster to the degree that its two half shells would be prevented from opening away from one another because, for the opening process to succeed, the two half shells must be free enough of compressional restraint to be allowed to partially separate as the opening blade is inserted within the oysters beak.

The back-stop also provides an oppositional-stop that keeps the oyster locked in place, under the influence of the considerable pressure exerted by the opening knife blade as it is penetrating the bill of the oyster while the knife blade is advanced forward by the users manipulation of the handle, as the oyster opening knife blade separates the two opposing and cartilage connected oyster half shells.

The back-stops curved and angled surface, when it is holding and cushioning an oyster during the process of its opening, is constructed in such a way that allows a user the ability to make minor or semi-major physical adjustments to the angle that the oyster is situated in, and further allows the user to slightly or moderately re-position the oyster being opened while it is under pressure from the oyster-opening knife. The back-stop should not totally immobilize or wholly 'lock-shut' the oyster being opened. It should allow the oyster that's in contact with it a degree of minor movement.

The back-stops can be of numerous varieties of shapes, cross sections, flexible-materials, chain mail, and of other lengths and arrangements considered or found to be most efficient for the supporting of wide varieties of differing shapes, physical qualities and types of oysters.

The back-stop can be itself curved, it can be a specific slice of a sphere, or cupped across its surface plane and it can also be tilted at an angle which allows the oyster that's positioned against the back-stop to be opened by the oyster opening knife as it is being held at a downward, sideways or upward angle in relation to the main body of the device. This curved and tilted back-stop allows the positioning of an oyster at any angle which allows the oyster knifes blade-tip to accomplish its optimal ease of entrance as it penetrates the downward or upward or sideways angled oyster that is situated and firmly held against the back-stop.

Alternately the back-stop itself can be made to turn or gimbal by a somewhat flexible assembly or via a mechanically linked connection at the point where it is connected to its supporting element)s) that are in turn connected to the main body of the hand held device which would allow the user to turn or gimbal the back-stop up-down and side-to-side as needed prior to and during the actual oyster opening process The structure for holding and supporting the back-stop can be a round, square or other shaped 'cage' made from bars 48 or from cast resin, plastics or from steel-rod or from carbon fiber. Alternately, barrel like open-tubes, open-cages, arrangements of shaped brackets or tubular rods or semi-open pods that are cast or formed into various shapes can also be effectively used to support the back-stop. Any means or mechanism that connects to the body and that serves to firmly support the back-stop, whether that back-stop is fixed to those means of support or can be moved along or within those means of support would suffice to create the desired result of creating a structure for holding and supporting the back-stop.

The bars 48 can be two legs of a U shaped member which wraps around the back of the body 20, is attached to the sides of the body and each bar is located between two projections 50 located on each side of the body which provides further support to the bars. The lower bottom end of the back-stop has two openings which receive and are slidably coupled to the bars which allows the back-stop to be moved along the bars toward the end of the push bar to accommodate various size oysters. Located to the left of the back-stop is a liquid catch member 52 which is slidably attached to the bars 48.

In an embodiment, the oyster holding device 14 can be a cage of strips of fabric, such as Kevlar straps or a flexible chain mail or by a loose assortment of interlinked metal rings, i.e.; or by any configurations of any appropriate materials that would hold, cushion and keep an oyster securely positioned as it was being opened under the considerable force from the opening knife. The cage can also be a holder that supports an oyster back-stop. The 'cage' can also be a simple bar, a bed or two parallel 'rails' of metal or some other high strength materials which permanently connects to a back-stop that's affixed to it, or that supports a movable-back-stop which would allow the user to 'hand-guide' the movable back-stop forward or backwards along the bar, bed or twin rails and that would allow a user to slide an oyster along the bar, bed or twin rails until it makes contact with the oyster supporting back-stop and is positioned against the oyster supporting back-stop in order that it be secured between that oyster supporting back-stop and the push-rods knife blade in preparation for it to be opened.

Alternatively a semi-flexible or flexible sling made from a sufficiently durable material such as woven chain metal, Kevlar, inter-linked components, nylon or some other durable flexible material, such as, but not limited to a sandwich of steel-fiber or a durable plastic which is used as the cage without the back-stop itself.

The various 'flexible slings' or semi-flexible slings can all hold the oyster to be opened within a flexible, cupping, basket like confine and would allow the user's free hand to control the angle and attitude that the oyster is positioned in while the pressure generated by that same user's other hand, while squeezing the handle, is incrementally applied and transferred to the push rod that, in turn is connected to the oyster opening knife blade.

A twisting of the sling by the user's hand that holds the oyster within the flexible sling will 'pop' the oyster's shell halves apart once the oyster's bill has been 'partially penetrated' by the oyster opening knife.

When opening an oyster at its beak end, there is an initial insertion of an oyster-opening blade into that bill until the knife blade becomes properly seated and has sufficiently entered the cartilage filled channel located between the two opposing halves of an oyster's overall shell. Once the knife blade has been sufficiently inserted within the narrow gap inside the oyster's beak it is customary for a user to quickly twist the oysters v-shaped knife rotationally in order to cause the oyster's two opposing shell halves to be rapidly forced apart and to separate further and away from each other as the rotated width of the turning knife-blade forces them further apart. This particular process is here referred to as 'popping' the oyster because of the vibratory feel it creates and because of the sound that's common when the quick knife-twisting procedure is employed. Often, when an oyster knife that is sufficiently inserted within the beak of the oyster is quickly turned there is a popping sound, one probably generated by the rapid tearing of cartilage that just previously had tightly held the two opposing oyster half shells of the overall oyster together prior to their forced separation by knife blade.

To facilitate the 'popping' of an oyster's two opposing half shell halves, a "T" shaped member or a 'Key' is located at the right hand end of the push rod, opposite the end that acts as the oyster-opening knife. This 'key' is an operating element that the user can manipulate by hand and which can be quickly turned once the oyster opening knife blade has gained sufficient entry into the opening or cartilage filled channel within the oysters beak. The net effect of turning the 'key' is that the knife blade, which enters the oysters bill as a flat and horizontal v-shaped blade is suddenly turned up and into a vertical mode as the 'Key' that it is attached to it is turned by the user. This action in turn quickly leverages and further opens the two halves of the oysters already partially-opened shell and thereby breaking or 'popping' the cartilage that held the two half shells together.

The liquid catch member 52 mentioned above could also include a basin, cupped tray, trough or other liquid capturing device or element that would catch, collect, capture and contain some or all of any liquid that escaped from the oyster during the process of opening it and that in turn, could be used to channel the captured liquid into another receptacle such as a bowl or a cup or an opened oyster via a spout, or via a channel on a section of those basins, cupped-trays, troughs or other said liquid-capturing elements.

In use, this new oyster opening device and its variants are relatively straight forward and the process of opening a single oyster can be as brief as five or six seconds, or even briefer. People with no previous experience can often immediately open seven oysters a minute with small concentration and effort. That's one opened oyster every eight or so seconds which itself is a very substantial advantage when compared with all other means of opening oysters.

After freeing extraneous materials that often adheres to the exterior of oysters and then washing the oysters that are to be opened, the oysters are allowed to drain and then placed in a bowl. Next the user holds the oyster opener here disclosed in one hand and with the other hand chooses an oyster and places it in the oyster opener device with the oyster's 'bill' in contact with the tip of the knife blade and against the fixed or movable back-stop. With a free-hand, the user positions the entire oyster at an angle appropriate for the knife blade to make its most efficient angle of entrance into the slightly downward positional entrance between the oysters two opposing shell halves at the end of the oysters 'beak'. Next the user uses the handle to advance the push rod until the tip of the blade makes contact with the narrow opening at the beak of the oyster. Then the user advances and leverages the oyster opening blade by squeezing the handle until the knife blades tip has gained an entrance into the narrow slightly open channel between the two opposing oyster shell halves at the oyster bill. Once about half an inch of the knife-blades tip enters into the oyster's shell and the two half shells have begun to partially separate, the user simply twists the key or the oyster itself to 'pop' the oyster's two opposing shell halves which opens them substantially further. At this time the oyster Is open and it's adductor muscles can be cut free from their shells with the oysters upper shell half next removed by the user, leaving a visually attractive and presentable oyster for the consumer of that commodity.

A flexible sling can be fashioned in many obvious ways to be quickly and easily removed from the hand held apparatus so that it may be stored, serviced, inspected or replaced. The flexible sling can be affixed to the body of the hand held apparatus by any number of mechanical means including but not limited to hooking ports, slide-on sleeves, grommet and pin ports, Velcro wraps or by other mechanical means that offer quick removal and quick affixing capabilities. Conversely, the flexible sling can also be permanently affixed to the main body of the oyster opening device by chemical adhesives, by riveting, by sonic welding, by nuts and bolts, by hot-stamping processes or by any other semi-permanent or permanently affixing means.

The inside-portion of the flexible sling can be fitted with an adjustable or non-adjustable, permanently affixed or removable back-stop that would additionally cushion, position and secure the oyster within the flexible sling.

In an embodiment the oyster opening knife blade can be loosely affixed to the push rod so that it slightly 'cants' or 'floats' a few degrees in both up down and side to side directions, which allows it to 'find' and seat itself in a naturally-preferred and naturally guided angle of attack within and then into the narrow, cartilage filled gap at the oysters beak.

In an embodiment a simple, small, one-piece sub-assembly can be affixed to the body of the device that allows a user to break off and remove any overhanging portion of the oysters bill that obstructs, impedes or blocks the easy introduction of the knife blades tip into the narrow, cartilage filled channel that lays between the two opposing shell halves at that portion of the oyster commonly referred to as the oysters beak. To employ a bill breaker, the user inserts the over hanging portion of the oysters bill that is to be removed from it and then forces the oyster's overall shell downwards while two small, opposing tempered metal bars act to chip off and break free that portion of the oyster's beak that would impede the knife blades tip from gaining easy assess into the narrow, cartilage filled channel that lays between the two opposing shell halves at that portion of the oyster commonly referred to as the oysters beak.

In an embodiment the entire push rod Itself can be made to 'slightly float' or angularly pivot a few degrees, so that its knife blades angular approach towards and initially into the slightly open area at the cartilage filled channel on the oysters beak can be manipulated, by-hand, for additional control by the user during the process of opening the oyster.

In an embodiment the leveraging ratio that occurs when a user squeezes the handle can be adjusted so that each squeeze of the handle delivers less forward movement to the push rod but, in-turn, delivers more forward force. The additionally leveraged force can be used to open the oyster so that even a person of extremely limited hand strength could, in actual practice use a more highly leveraged oyster opening device to open an oyster.

In an embodiment the body of the oyster opening device can contain a port or sleeve for the storage and quick retrieval of a dedicated adductor muscle cutting knife.

In an embodiment the body of the oyster opening device can be provided with an internal or external element that allows it to be connected to and supported upon an upright stand for the purpose of opening oysters over a sink.

In an embodiment the body of the oyster opening device can be provided with a fast lockdown and release function that quickly locks and unlocks the back-stop to or from a guide bar or to or from a set of twin guide rails and that takes place in under a second and that's facilitated by the light pressing of a button on or near the back-stop by the user While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. Apparatus for opening an oyster shell comprising:
   a body having a push rod with a key at one end and a blade for opening an oyster shell at its other end;
   a drive coupled to a movable handle to incrementally advance the push rod from a retracted position to an extended position each time the handle is squeezed;
   a manually operable drive mechanism coupled to the push rod that frictionally engages the push rod and allows the push rod to be incrementally advanced to extended positions and a quick release mechanism that holds the push rod in the extended positions as it's driven forward and, when released by the user, allows the push rod to be freed and returned to its fully retracted default starting position;
   a spring coupled to the push rod to automatically urge the push rod to return to its fully retracted position when the manually operable quick release brake is operated; and
   a static or movable oyster holding backstop coupled to the body via a horizontal bar, a horizontal bed or a horizontal set of rails for the rapid insertion, positioning and securing of an oyster with in the device, and for holding an oysters shell securely in place as the blade of the push rod is advanced and forced between the oyster shell halves during the process of opening it.

2. The apparatus of claim 1 wherein the drive includes a movable handle that the user can incrementally squeeze to forward an oyster opening knife blade at a controllable and incrementally adjustable rate.

3. The apparatus of claim 2 wherein the push rod is rotatably coupled to the drive allowing the user to turn the knife blade in a 360 degree fashion to best position the blades tip in relation to the oyster, prior to the oyster being opened, during the oysters actual opening and after the oyster within the device has been opened.

4. The apparatus of claim 3 wherein the blade at the end of the push rod is specifically contoured, gradually curved and wedge shaped and can be turned and oriented in a radius of 360 degrees by the user to situate the knife-blade to best and most efficiently enter an oyster's beak and to facilitate a controllable and nuanced leveraged-opening of the oyster's two opposing half shells.

5. The apparatus of claim 4 wherein the key at one end of the push rod is a member which extends radially out from the axis of the push rod.

6. The apparatus of claim 5 wherein the key is a conveniently shaped cross member that is easily grasped and turned by the users hand which allows the user to rotate the push rod 360 degrees.

7. The apparatus of claim 5 wherein the spring coupled to the push rod for rapidly urging the push rod to return to its fully retracted position, in under one half second, is located around the push rod between the body and the key.

8. The apparatus of claim 7 wherein a positive stop is attached to the push rod to define the fully retracted position of the push rod.

9. The apparatus of claim 8 wherein the positive stop is a pin or mechanical-stop attached to the push rod.

10. The apparatus of claim 4 wherein the oyster holding back-stop is permanently affixed to a bar, a bed or set of rails which extend from and which are affixed to the body, or an oyster holding backstop that is movable and can be slid along a bar, a bed or set of rails which horizontally extend from and which are affixed to the body.

11. The apparatus of claim 10 wherein the back-stop is slidably coupled to a horizontal supporting element that in turn is permanently connected to the body that the back-stop can be instantly and non-movably locked to resist its movement away from the body by the pressure exerted by the push rod pushing on an oyster shell located between the back-stop and the oyster opening knife blade at the end of the push rod.

12. The apparatus of claim 11 wherein the back-stop is made of plastic, metal, neoprene, rubber or sponge for holding and cushioning an oyster securely in place while pressure from the oyster opening knife blade applies pressure to the overall oyster shell as it pushes against the narrow opening of the oyster shell.

13. The apparatus of claim 12 wherein the oyster holding member has the shape of a curved-plane, a cup, an oval, a circular ring, a block of inverted steps, a pleated-plane, a cone, an open pyramid or any configuration or shape that sufficiently holds an oyster in place while it is being opened.

14. The apparatus of claim 1 wherein the oyster being opened can be easily and rapidly leveled through visual inspection by the user who can rapidly manipulate the entire lightweight and handheld device as the oyster is being opened in order to prevent oyster liquid spillage and to prevent the unwanted loss of the oyster's valuable liquor.

15. The apparatus of claim 1 wherein the functional integration of all the devices basic components including the force leveraged knife blade, the rapidly adjustable spring loaded back-stop, the automatically retracting spring loaded knife blade and the simplicity of the devices overall design all facilitate a very rapid placement of, efficient positioning of, a total securing of, the visually based leveling of, the actual opening of and the rapid removal of an oyster by the user of the device.

16. The apparatus of claim 1 wherein a movable sliding back-stop is provided with a rapid lockdown and release function in the form of a conveniently located activation-button that is easily manipulated by the user and which allows the back-stop to be instantly locked to or unlocked from, in well under one second, a horizontally protruding guide bar, a guide bed or a set of guide rails to which the back-stop is loosely mechanically linked and which themselves are horizontally affixed to the body of the device which facilitates the very rapid insertion of, the very rapid positioning of, the very rapid locking and securing of, the very rapid opening of, or the very rapid removal of an oyster by the user of this device.

17. The apparatus of claim 1 wherein the oyster supporting back-stop includes a rapid lockdown and release function that the user can manipulate in under one second, to lock the back-stop to and to release the back-stop from its supporting guide bar, guide bed or set of guide rails which themselves are horizontally affixed to the body.

18. The apparatus of claim 1 wherein the entire device is small and lightweight enough to be instantly leveled by the user to prevent the loss of the oyster liquor as it is being opened.

19. The apparatus of claim 1 wherein the oyster holding back-stop is a specifically machined and specifically contoured and shaped element or is comprised of a retaining sling or a semi-flexible or flexible oyster supporting buttress made from woven chain metal, Kevlar, nylon, a hybrid sandwich of steel and plastic or plastic or from another flexible, semi-flexible or rigid material matrix.

20. A method for opening an oyster shell comprises:
providing a body having a push rod with a key at one end and a blade for opening an oyster shell at its other end;
providing a drive coupled to a movable handle to incrementally advance the push rod from a retracted position to an extended position each time the handle is squeezed;
providing a manually operable drive mechanism coupled to a push rod that frictionally engages the push rod and allows the push rod to be incrementally advanced to extended positions,
providing a separate quick release locking mechanism that locks the push rod in those extended positions as it's driven forward and, when released by the user, allows the push rod to be freed to returned to its fully retracted position via a retraction spring coupled to the push rod that automatically urges the push rod to return to its fully retracted position when the manually operable quick release locking mechanism is operated; and
a static oyster securing backstop permanently affixed to a horizontal supporting element connected to the body or a movable oyster holding back-stop loosely and mechanically linked to a horizontal guide bar, a horizontal guide bed or to a set of horizontal guide rails that are themselves permanently attached to the body, that holds an oyster shell rigidly in place between the oyster holding back-stop and the knife-blade as the knife-blade is advanced and mechanically forced between the oysters beak shell halves via leveraging force that's controllably and incrementally applied by the user.

* * * * *